2,906,758
3-(HYDROXYALKYL)-ETHERS OF ESTRADIOL

Fred Allan Kincl, Howard J. Ringold, and George Rosenkranz, Mexico City, Mexico, assignors to Syntex S.A., Mexico City, Mexico, a corporation of Mexico No Drawing. Application April 21, 1958
Serial No. 729,519

Claims priority, application Mexico April 22, 1957

6 Claims. (Cl. 260—397.5)

The present invention relates to novel cyclopentanophenanthrene derivatives and to a novel process for the production thereof.

More particularly the present invention relates to 3(hydroxyalkyl)-ethers of estradiol, i.e. 3-(hydroxyalkoxy)-17β-hydroxy-$\Delta^{1,3,5(10)}$-estratriene and esters thereof. The novel compounds of the present invention just referred to are hormones of the estrogenic type having minimum of estrogenic activity while still retaining the power to lower the cholesterol level in the blood. The novel compounds of the present invention are therefore useful for the treatment of hardening of the coronary arteries since they lower the cholesterol level with an absence of feminizing side reaction.

In accordance with the present invention the surprising discovery has been made that the hydroxyalkyl ethers of estradiol exhibit an almost complete absence of the feminizing effect characteristic of estradiol, whereas the corresponding alkyl ether without the hydroxyl group such as the ethyl ether of estradiol still shows the properties of the free phenols. On the other hand the hydroxyalkyl ether still retains the ability of the estradiol to lower the cholesterol in the blood. In accordance with the present invention it has been discovered that the novel hydroxyalkyl ether of estradiol may be prepared from the corresponding hydroxyalkyl or carboxyalkyl ether of estrone by reducing these compounds with an alkali metal hydride reducing agent such as sodium borohydride or lithium aluminum hydride. The resultant hydroxyalkyl ether may then be esterified in a conventional manner to prepare the corresponding diesters of hydrocarbon carboxylic acids of 2 to 12 carbon atoms. The novel active compounds of the present invention may, therefore, be characterized by the following formula:

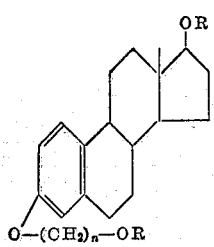

In the above formula $n$ represents a whole number of value 2 to 5 and R represents either hydrogen or an acyl group derived from a hydrocarbon carboxylic acid of 2 to 12 carbon atoms, of straight or branched chain, saturated or unsaturated, cyclic or mixed cyclic-aliphatic which may be conventionally substituted as known in the art with methoxy or halogen. Typical ester groups comprise acetate, propionate, butyrate, hemisuccinate, caproate, benzoate, trimethylacetate, cyclopentylpropionate, phenylpropionate and β-chloropropionate.

The novel process for the production of the compounds of the present invention may be illustrated by the following equation:

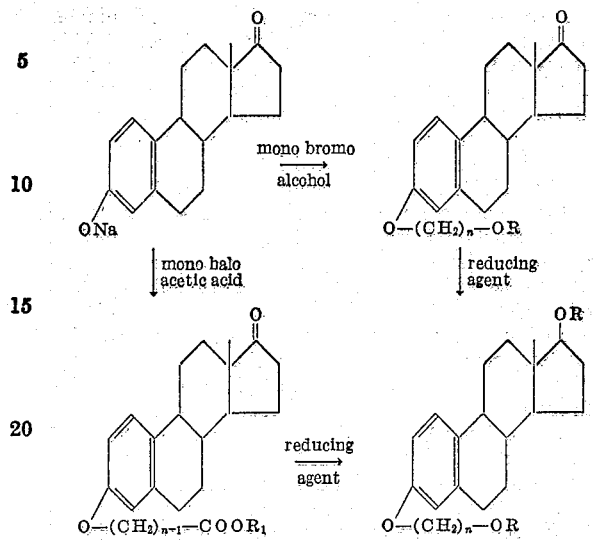

In the above equation $n$ has the same value as heretofore given and R represents the same groups. $R_1$ represents hydrogen or lower alkyl. Referring to the above equation, the sodium salt of estrone is conventionally prepared by reaction with sodium hydroxide in the presence of methanol. To prepare the hydroxyalkyl or carboxyalkyl ethers, the sodium salt of estrone is reacted either with a mono bromo alkanol derivative such as 2-bromoethanol (to form the corresponding hydroxyalkyl ether) or with a monohalo acetic acid to form the carboxyalkyl ether.

Treatment of either the hydroxyalkyl ether of estrone or the carboxyalkyl ether of estrone with a reducing agent such as lithium aluminum hydride or sodium borohydride reduces the carbonyl group or groups to form in both cases the 3-hydroxyalkyl ethers of estradiol. Conventional esterification of these estradiol derivatives with an anhydride or an acid chloride derived from a hydrocarbon carboxylic acid of 2 to 12 carbon atoms, including those previously specifically set forth, gave the corresponding diester.

The following specific examples serve to illustrate, but are not intended to limit the present invention.

Example I 135 g. (0.5 mol) of estrone was added to a solution of 11.5 g. (0.5 mol) of sodium metal in 1 liter of absolute ethanol and the mixture was evaporated to dryness under reduced pressure. The solid sodium salt of estrone was suspended in 2.5 lt. of anhydrous toluene and mixed with 111.6 g. (0.6 mol) of sodium iodide and 43.5 cc. of 2-bromoethanol (0.6 mol) which was added dropwise in the course of 2 hours. After the addition, the mixture was refluxed for 2 hours and then allowed to cool overnight. The mixture was evaporated to dryness under reduced pressure, the residue was dissolved in a mixture ethanol-chloroform (2:1) and the solution was washed with dilute hydrochloric acid, with water, dried and evaporated to dryness. There was thus obtained 135 g. of the hydroxyethyl ether of estrone having a melting point of 117–118° C., $[\alpha]_D +131°$ (chloroform).

Similarly, the reaction of the sodium salt of estrone with the acetate of 2-bromoethanol produced the 3-(acetoxyethyl)-ether of estrone (M.P. 133–135° C., $[\alpha]_D +126°$ (methanol), ultraviolet absorption maximum λ max. 277 mμ (log E 3.28 and 3.25)).

Example II 1.0 g. of extrone (1) was dissolved in a mixture of 3.5 cc. of 33% aqueous sodium hydroxide solution and 1 cc. of methanol. There was added 2.5 cc. of 50% aqueous monochloroacetic acid solution and the mixture was refluxed on the steam bath. After every 20 minutes there were added additional portions of 2 cc. of 33% aqueous sodium hydroxide solution and 1 cc. of 50% aqueous monochloroacetic acid solution to a total of 19.5 cc. of sodium hydroxide solution and 10.5 cc. of monochloroacetic acid solution. At the end of 3 hours the reaction mixture was poured into 50 cc. of ice water, strongly acidified with concentrated hydrochloric acid and the precipitate was filtered, washed with water to neutral, dried and treated with 160 cc. of methylene dichloride. The organic layer was separated and extracted twice with 5% sodium bicarbonate solution, thus dissolving the sodium salt formed from the carboxyl group of the ether, while the unreacted estrone, involuble in water, remains in the organic phase. The carboxymethyl ether of estrone precipitated upon acidfication with hydrochloric acid of the aqueous phase; the precipitate was collected, washed with water to neutral and dried. There was thus obtained 750 mg. of the carboxymethyl ether of estrone with a melting point of 210–213° C. Recrystallization from methanol or from ethyl acetate afforded the pure substance with a melting point of 213–214° C., $[\alpha]_D + 134°$ (chloroform).

Example III 10 g. of the carboxymethyl ether of estrone, obtained in accordance with Example No. II, was dissolved in 120 cc. of absolute methanol and a stream of dry hydrogen chloride was introduced into the solution until the weight increased in about 6 grams. The mixture was kept standing overnight in the refrigerator and the precipitate was then collected, washed with water to neutral and dried. There was thus obtained 7.5 g. of the methyl ester of the carboxymethyl ether of estrone, with a melting point of 128–129° C., $[\alpha]_D + 117°$ (chloroform). Concentration of the mother liquors afforded an additional crop which raised the yield to a total of 90%.

Following the same procedure but using ethanol there was prepared the (carboxymethyl)-ethyl ether of estrone melting point 100–102° C., $[\alpha]_D + 126°$ (chloroform).

Example IV

A solution of 1 g. of the 3-(acetoxyethyl)-ether of estrone in 160 cc. of methanol was cooled to 5° C. and slowly treated, with stirring, with a solution of 1.2 g. of sodium borohydride in 20 cc. of water. The mixture was stirred for one hour further and kept standing overnight at room temperature. It was then acidified with acetic acid, concentrated under reduced pressure to a small volume and extracted with ethyl acetate. The extract was washed with water, dried over anhydrous sodium sulfate and evaporated to dryness. The oily residue crystallized upon trituration with ether to give the 3-(hydroxyethyl)-ether of estradiol in the form of needles (M.P. 142–148° C.). The analytical sample was obtained by repeated crystallizations from ether-acetone (M.P. 155–156° C., $[\alpha]_D + 74°$ (chloroform)).

Similarly, the hydroxyethyl ether of estrone was converted into the 3-(hydroxyethyl)-ether of estradiol, identical to the compound described above.

Example V

A solution of 1 g. of the (carboxymethyl)-methyl ether of estrone in 40 cc. of tetrahydrofurane was added dropwise to a stirred suspension of 0.6 g. of lithium aluminum hydride in 40 cc. of tetrahydrofurane and the mixture was refluxed for 1 hour. The excess of hydride was decomposed by the cautious addition of acetone, the precipitate was filtered and washed with hot tetrahydrofurane and the filtrate and washings were combined and evaporated to dryness. The oily residue was triturated with ether and then recrystallized several times from ether-acetone, thus giving the 3-(hydroxyethyl)-ether of estradiol, identical to the compound obtained in accordance with the method described in Example IV.

Similarly, the carboxymethyl ether of estrone was converted into the same compound.

Example VI

A mixture of 1 g. of the 3-(hydroxyethyl) ether of estradiol, 20 cc. of pyridine and 1 cc. of acetic anhydride was allowed to react at room temperature overnight. After dilution with water the product was extracted with ethyl acetate, washed with dilute hydrochloric acid, sodium bicarbonate solution and water, dried over anhydrous sodium sulfate and the ethyl acetate was removed by distillation. The residue crystallized from acetone-ether to give the diacetate of the 3-(hydroxyethyl) ether of estradiol (3-acetoxyethoxy)-17β-acetoxy-$\Delta^{1,3,5(10)}$-estratriene).

In the same conventional way reaction of the 3-(hydroxyethyl) ether of estradiol with the corresponding acid anhydride or acid chloride gave the corresponding diproprionate, dibenzoate and dicyclopentylpropionate. Similar conventional esterification reactions gave the same mono esters of the hydroxyethyl ether of estrone and of the carboxymethylether of estrone.

We claim:

1. A process for the production of 3-(hydroxy ethyl) ethers of estradiol comprising treating a corresponding compound selected from the group consisting of 3-(hydroxyalkoxy) and 3-(carboxyalkoxy) derivatives of estrone with a reducing agent selected from the group consisting of sodium borohydride and lithium aluminum hydride.

2. The process of claim 1 wherein the reducing agent is sodium borohydride.

3. The process of claim 1 wherein the reducing agent is lithium aluminum hydride.

4. A compound of the following formula:

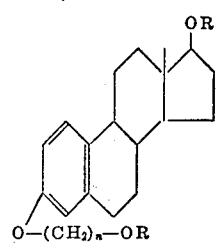

wherein n is a whole number of value 2 to 5 and R in both instances is selected from the group consisting of hydrogen and a hydrocarbon carboxylic acyl group of 2 to 12 carbon atoms.

5. 3-(hydroxyethoxy)-$\Delta^{1,3,5(10)}$-estrien-17β-ol.

6. The hydrocarbon carboxylic acid diesters of 2 to 12 carbon atoms of 3-(hydroxyethoxy)-$\Delta^{1,3,5(10)}$-estratrien-17β-ol.

No references cited.